(12) United States Patent  (10) Patent No.: US 9,011,557 B2
Frey et al.  (45) Date of Patent: Apr. 21, 2015

(54) SYSTEM FOR DRYING A GASIFICATION FEED

(75) Inventors: George Frederick Frey, Houston, TX (US); George Morris Gulko, Houston, TX (US)

(73) Assignee: General Electric Company, Schenectady, NY (US)

( * ) Notice: Subject to any disclaimer, the term of this patent is extended or adjusted under 35 U.S.C. 154(b) by 363 days.

(21) Appl. No.: 13/438,774

(22) Filed: Apr. 3, 2012

(65) Prior Publication Data

US 2013/0255143 A1    Oct. 3, 2013

(51) Int. Cl.
    *C10L 5/00*  (2006.01)
    *F26B 21/10*  (2006.01)
    *C10L 5/36*  (2006.01)
    *F26B 1/00*  (2006.01)
    *F26B 17/10*  (2006.01)

(52) U.S. Cl.
    CPC ......... *F26B 21/10* (2013.01); *C10J 2300/0906* (2013.01); *C10J 2300/0909* (2013.01); *C10J 2300/0969* (2013.01); *C10J 2300/1678* (2013.01); *C10J 2300/1815* (2013.01); *C10L 5/363* (2013.01); *C10L 5/366* (2013.01); *F26B 1/005* (2013.01); *F26B 17/10* (2013.01)

(58) Field of Classification Search
    CPC .... C10L 2290/04; C10L 2290/08; C10J 3/48; C10J 3/50; F26B 21/10
    USPC ................................................... 44/629, 620
    See application file for complete search history.

(56) References Cited

U.S. PATENT DOCUMENTS

| 3,737,285 | A | * | 6/1973 | Hicks, Jr. |
| 4,134,740 | A | | 1/1979 | Marion et al. |
| 4,209,304 | A | | 6/1980 | Kessler et al. |
| 4,502,869 | A | | 3/1985 | Jahnke et al. |
| 4,559,061 | A | | 12/1985 | Jahnke et al. |
| 4,627,459 | A | | 12/1986 | Gulko |
| 4,778,483 | A | | 10/1988 | Martin et al. |
| 4,876,987 | A | | 10/1989 | Martin et al. |
| 4,936,376 | A | | 6/1990 | Martin et al. |
| 4,976,101 | A | | 12/1990 | Schiffers |
| 5,233,943 | A | | 8/1993 | Martin et al. |
| 5,953,899 | A | | 9/1999 | Rao et al. |
| 2006/0075682 | A1 | | 4/2006 | Bullinger et al. |
| 2010/0324156 | A1 | | 12/2010 | Winter et al. |
| 2011/0016787 | A1 | | 1/2011 | Dinu et al. |

* cited by examiner

*Primary Examiner* — Cephia D Toomer
(74) *Attorney, Agent, or Firm* — Fletcher Yoder, P.C.

(57) ABSTRACT

Present embodiments include systems for reducing moisture in a solid feed provided to a gasifier. For example, in an embodiment, a feedstock preparation system includes an aspirator having a first inlet for receiving a flow of steam, a second inlet for receiving a flow of a moist gaseous phase from a grinding mechanism configured to grind a solid fuel in the presence of a conveyance gas. The moist gaseous phase includes the conveyance gas and moisture removed from the ground solid fuel. The aspirator also includes an outlet configured to output a reduced pressure flow having the steam and the moist gaseous phase. The aspirator is configured to enhance moisture removal from the ground solid fuel to produce a dry feed of the ground solid fuel. The aspirator discharge is recycled within the process to heat the incoming dry conveyance gas and improve system efficiency.

16 Claims, 5 Drawing Sheets

SYSTEM FOR DRYING A GASIFICATION FEED

BACKGROUND OF THE INVENTION

The subject matter disclosed herein relates to systems and methods for providing a dry feed of fuel to a gasification system.

Synthesis gas, or syngas, is a mixture of hydrogen ($H_2$) and carbon monoxide (CO) that can be produced from carbonaceous fuels. Syngas can be used directly as a source of energy (e.g., in combustion turbines), or can be used as a source of starting materials for the production of other useful chemicals (e.g., methanol, formaldehyde, acetic acid). Syngas is produced in large scale by gasification systems, which include a gasification reactor or gasifier that subjects a carbonaceous fuel, such as coal, and other reactants to certain conditions to produce an untreated or raw syngas. To increase the efficiency of the gasification reaction, the stoichiometric ratio of coal to water within the gasifier is typically maintained within a desired range.

Coal may be collected from various sources, which can lead to different ranks, or qualities, of the coal. Generally, low-rank coals will have higher water content, while high-rank coals have a lower water content. Unfortunately, the variance in water content from one rank of coal to another may reduce the ability to produce syngas using a single set of conditions for all types of coal. For example, in conditions where low-rank coals are used, the estimation of the water content of the coal may not be accurate, which can lead to inefficiencies during gasification of the low-rank coal. That is, a portion of the heat provided to the gasifier for driving the gasification of the carbonaceous fuel within the low-rank coal may be instead used to produce steam from the water of the coal. These inconsistencies in the coal can reduce the efficiency of the gasifier, reduce the life of the gasifier and associated equipment, and reduce the predictability of the syngas (e.g., the energy content of the syngas).

BRIEF DESCRIPTION OF THE INVENTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system is provided. The system includes a feedstock preparation system configured to provide a feed comprising a ground solid fuel to a gasification system, wherein the feedstock preparation system comprises a grinding mechanism configured to receive a solid feed comprising a solid fuel and grind the solid feed in the presence of a conveyance gas to produce a mixture of the ground solid fuel and a moist gaseous phase, wherein the moist gaseous phase comprises the conveyance gas and moisture from the solid fuel an aspirator, comprising a first inlet configured to receive a flow of steam; a second inlet configured to receive a flow of the moist gaseous phase; and a fluid outlet configured to output a reduced pressure flow comprising the flow of steam and the flow of the moist gaseous phase; wherein the aspirator is configured to enhance moisture removal from the ground solid fuel.

In another embodiment, a system is provided. The system includes an aspirator having a first inlet configured to receive a flow of steam a second inlet configured to receive a flow of a moist gaseous phase from a grinding mechanism configured to grind a solid fuel in the presence of a conveyance gas, wherein the moist gaseous phase comprises the conveyance gas and moisture removed from a ground solid fuel, an outlet configured to output a reduced pressure flow comprising the flow of steam and the flow of the moist gaseous phase. The aspirator is configured to create a pressure gradient between the grinding mechanism and the aspirator to enhance moisture removal from the ground solid fuel. The system also includes a controller configured to adjust a flow rate of the flow of steam to the aspirator.

In a further embodiment, a system is provided. The system includes a feedstock preparation system configured to provide a feed having a ground solid fuel to a gasification system. The feedstock preparation system includes a grinding mechanism configured to receive a solid feed having a solid fuel and to grind the solid feed in the presence of a conveyance gas to produce a mixture of the ground solid fuel and a moist gaseous phase. The moist gaseous phase includes the conveyance gas and moisture from the solid fuel. The feedstock preparation system also incldues an aspirator configured to receive and mix a flow of steam and a flow of the moist gaseous phase. The aspirator is also configured to reduce a pressure of a mixture of the ground solid fuel and the moist gaseous phase to remove the moisture from the ground solid fuel. The system also includes a gasifier configured to receive the feed from the feedstock preparation system and subject the feed to gasification conditions to produce an untreated syngas.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As noted above, the high moisture level in a solid feed stock (e.g., a low rank coal) negatively affects its transportability. Removing moisture facilitates conveyance of smaller particle coals that would otherwise clump after being pulverized. In feed preparation, large amounts of energy may be used to vaporize the moisture inherent to the feed stock. In accordance with the present disclosure, it is now recognized that this energy may be re-used rather than directly releasing this energy to the atmosphere (e.g., via steam). In re-using this energy, the improvement in process efficiency is greatest for larger amounts of drying. Embodiments of the present approaches for re-using this energy are described in detail below.

It should be noted that while the present disclosure is discussed in the context of low-rank coals, the embodiments described herein are applicable to any number of solid feeds for gasification and/or energy production, such as biomass, coals, or any other such solid feed that may contain moisture. In embodiments where the solid fuel used for syngas production includes a low-rank coal, the solid fuel (i.e., coal) may have unpredictable amounts of moisture, and may have non-uniform concentrations of carbonaceous fuel. Excess water in the feed reduces the ability to convey the feedstock and reduces the gasifier efficiency by having to vaporize the moisture (e.g., rather than using energy for the conversion of coal to syngas). This can lead to large temperature variations or other variations within a gasifier and associated equipment. To reduce variations such as these, the present embodiments are generally directed toward the use of one or more aspirators for producing a vacuum within one or more vessels in a feedstock preparation system. For example, an aspirator may be directly or indirectly coupled to a gas outlet of a grinding mill. The aspirator may receive pressurized steam, such as high pressure (HP), medium pressure (MP), or low pressure (LP) steam, in addition to a moist conveyance gas generated within the grinding mill. The aspirator, in a general sense, uses the pressurized steam to increase a mass flow rate of a conveyance gas used to convey a solid feed ground within the grinding mill. For example, the conveyance gas may include air, nitrogen, carbon dioxide, helium (He), argon (Ar), neon (Ne), or any combination thereof. The pressurized steam may, therefore, provide increased motive force for the conveyance gas. Additionally, the pressurized steam may provide sensible and latent heat to the conveyance gas. The increased motive force and heat provided to the conveyance gas may facilitate the removal of moisture from, and therefore the drying of, the solid feed to produce moist conveyance gas and a substantially dry solid feed containing a substantially dry solid fuel.

At least a portion of the energy contained within the pressurized steam after it passes through the aspirator is able to be recycled by heating fresh conveyance gas provided to the grinding mechanism using the steam. Because of the manner in which this energy is recycled, it generally becomes more beneficial to recapture such heat for higher levels of moisture content of the feed.

Figure 1:
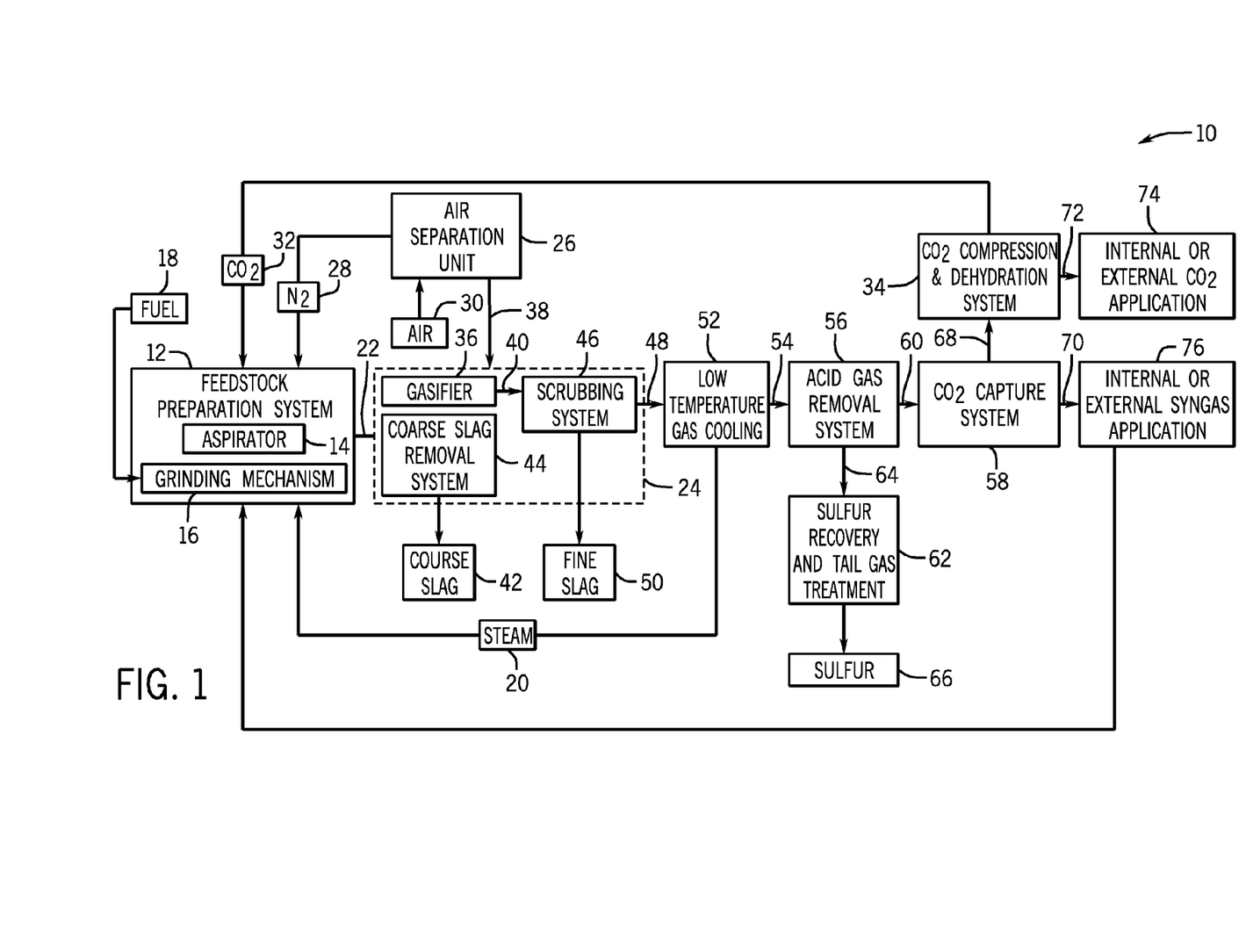
FIG. 1 is block diagram illustrating an embodiment of a syngas production system having a feedstock preparation system with an aspirator configured to remove moisture from a solid fuel ground within a grinding mechanism.

FIG. 1 illustrates a block diagram of an embodiment of a gasification and treatment system 10 having a feedstock preparation system 12 having an aspirator 14 directly or indirectly coupled with a grinding mechanism 16 in accordance with the disclosed embodiments. Elements of the system 10 may also include a carbonaceous fuel 18, such as a solid coal feed, which may be utilized as a source of energy and/or for the production of syngas or substitute natural gas (SNG). The fuel 18 may include coal, petroleum coke, biomass, wood-based materials, agricultural wastes, tars, coke oven gas and asphalt, or other carbon containing items. The feedstock preparation system 12 may include several subsystems. For example, the preparation system 12 may include, by way of example, a grinder, chopper, mill, shredder, pulverizer, or other feature for resizing or reshaping the fuel source 18 by chopping, milling, shredding, pulverizing, briquetting, or pelletizing the fuel 18 to generate feedstock. In accordance with present embodiments, moisture within the fuel 18 is removed within the feedstock preparation system 12 using at least the aspirator 14 and the grinding mechanism 16, thus yielding dry feedstock.

In accordance with present embodiments, the aspirator 14 may use pressurized steam 20, such as high, medium, or low pressure steam, or any combination thereof, to produce a pressure gradient (e.g., a vacuum) by the Venturi effect between the grinding mechanism 16 and the aspirator 14. As discussed in detail below, the pressure gradient is configured to facilitate the removal of moisture from the fuel 18 as it is ground and heated within the grinding mechanism 16. By way of non-limiting example, the solid fuel 18 may be between approximately 5 and 60% water by weight (i.e., moisture), such as between approximately 10 and 50% water by weight, or between approximately 30 and 40% water by weight, and the aspirator 14, used in combination with the grinding mechanism 16 and various heated gas flows, may reduce the moisture content of the solid fuel 18 to produce a feed of the dry solid fuel 22 having between approximately 0 and 20% water by weight, such as between approximately 5 and 20%, 10 and 20%, or 15 and 20% water by weight. Indeed, in certain embodiments, the solid fuel 18 may be greater than approximately 10%, 15%, 20%, 25%, 30% or 35% water by weight. Further, in certain embodiments, the aspirator 14, used in combination with the grinding mechanism 16 and various heated gas flows, may reduce the moisture content of the solid fuel 18 to produce a feed of the dry solid fuel 22 having less than approximately 5%, 10%, 15%, or 20% water by weight. Thus, the feedstock preparation system 12 may be configured to remove at least 10% of the moisture in the solid fuel 18, such as at least approximately 15%, 20%, 25%, 30%, 40%, 50%, or more of the moisture in the solid fuel 18. The operation of the feedstock preparation system 12 and, specifically, the aspirator 14 and grinding mechanism 16, are discussed in further detail below with respect to FIGS. 2-5.

The feedstock preparation system 12 is configured to deliver the feed of the dry solid fuel 22 to a gasification and scrubbing system 24 disposed downstream from the feedstock preparation system 12. The feed of solid fuel 22 may include the dried solid fuel and other components, such as a conveyance gas, fluxants, additives, and/or catalysts. Sources of conveyance gas may include an air separation unit (ASU) 26 configured to separate nitrogen ($N_2$) 28 from air 30, with the $N_2$ 28 being provided to the feedstock preparation system 12. Additionally or alternatively, the feedstock preparation system 12 may receive a flow of compressed $CO_2$ 32 from a $CO_2$ compression and dehydration system 34. The aspirator 14, in some embodiments, may be configured to increase a mass flow rate of the conveyance gas (e.g., the $N_2$ 28 and/or $CO_2$ 32) through the grinding mechanism 16 to enable enhanced moisture removal from the fuel 18.

As noted, the flow of solid fuel 22 is provided to the gasification and scrubbing system 24, such as to a gasifier 36 with a quench cooler or radiant syngas cooler. The gasifier 36 of the gasification and scrubbing system 24 may convert the solid fuel into a combination of CO and $H_2$, i.e., syngas. To aid with this process, a stream of oxygen 38 may be supplied to the gasifier 36 of the gasification and scrubbing system 24 from the ASU 26. The syngas produced within the gasification and scrubbing system 24 may include syngas substituents, as well as $CO_2$, $CH_4$, and other acid and/or sulfur-containing gases, which may be considered to be by-products. In certain embodiments, this syngas mixture may be referred to as a raw or untreated syngas 40. The gasifier 36 may also generate waste, which produces a coarse slag 42. The coarse slag 42 may be removed by a coarse slag removal system 44. The coarse slag 42 may be disposed of, for example, as road base, or as another building material. Additionally, a scrubbing subsystem 46 may clean the untreated syngas 40 by removing any particulate matter from the untreated syngas 40, such as wet ash, to produce a scrubbed syngas 48 and a fine slag 50.

The scrubbed syngas 48 may then be sent to various treatment systems, such as a low temperature gas cooling (LTGC) unit 52, where the temperature of the scrubbed syngas 48 is reduced to produce the pressurized steam 20 and a cooled stream of scrubbed syngas 54. While any suitable pressure is presently contemplated for the pressurized steam 20, in such a configuration, the pressurized steam 20 may be a low pressure steam having a pressure between approximately 1 and 15 bar, such as between approximately 2 bar and 13 bar, 3 bar and 11 bar, or between approximately 4 bar and 9 bar.

In some embodiments, the scrubbed syngas 48 is cooled so that a downstream acid gas removal (AGR) system 56 and carbon capture system 58 may more effectively treat the scrubbed syngas 48. For example, in embodiments where the scrubbed syngas 48 is cooled to produce the cooled stream of scrubbed syngas 54, gases such as $H_2S$ and $CO_2$ may have higher solubilities in the solvent(s) used to remove them from other syngas components (i.e., CO and $H_2$). In certain embodiments, at least a portion of the $CO_2$ which is dissolved may eventually be used as the conveyance gas $CO_2$ 32 that is provided to the feedstock preparation system 12. The LTGC unit 52 may cool the scrubbed syngas 48 in a variety of processes, including heat exchange, gas expansion, and so forth.

Subsequent to cooling, the stream of cooled scrubbed syngas 54 is sent to the AGR system 56 and, subsequently, to a carbon capture system 58. The AGR system 56 may treat the cooled scrubbed syngas 54 to remove various gases and/or elements. For example, acid gases such as HCl, HF, COS, HCN, and $H_2S$ may be removed from the cooled scrubbed syngas 54 to generate a first stream of treated syngas 60 (e.g., syngas substantially free of sulfur). Additionally, the AGR system 56 may transmit the removed gases and/or elements of the cooled scrubbed syngas 54 (e.g., the HCl, HF, COS, HCN, and $H_2S$) to a sulfur recovery and tail gas treatment system 62. In the illustrated embodiment, the AGR system 56 may provide acid gas 64 to the sulfur recovery and tail gas treatment system 62, which may separate sulfur 66 using, for example, a Claus reactor.

The carbon capture system 58 may dissolve and remove a large portion of the $CO_2$ contained within the first stream of treated syngas 60 to produce a stream of $CO_2$ 68 and a second stream of treated syngas 70. In the illustrated embodiment, the stream of $CO_2$ 68 is provided to the $CO_2$ compression and dehydration system 34, which is generally configured to remove moisture from the stream of $CO_2$ 68 and generate a pressurized $CO_2$ 72. In accordance with certain presently disclosed embodiments, the pressurized $CO_2$ 72 may be sent to the feedstock preparation system 12 as the stream of $CO_2$ 32 for use as a conveyance gas. The pressurized $CO_2$ 72 may, alternatively or additionally, be provided to an internal or external $CO_2$ application 74, such as to a chemical production plant, or other internal application that may utilize $CO_2$. The second stream of treated syngas 70 is provided to an internal or external syngas application 76, such as one or more gas turbines (e.g., turbine-driven generators, methanation systems to generate SNG, external chemical plants, and so on.

As noted above, the quality, quantity, reliability, and other considerations of the syngas produced by the system 10 may depend, at least partially, on the quality of the fuel directed to the gasifier 36. For example, as set forth above, it may be desirable to reduce the moisture levels in the solid feed 22 provided to the gasification and scrubbing system 24. In accordance with present embodiments, the feedstock preparation system 12 uses the aspirator 14 to facilitate the extraction of moisture from the fuel 18 to produce the feed of the dry solid fuel 22. Such a configuration is illustrated in FIG. 2, which is a schematic block diagram of an embodiment of the feedstock preparation system 12.

Figure 2:
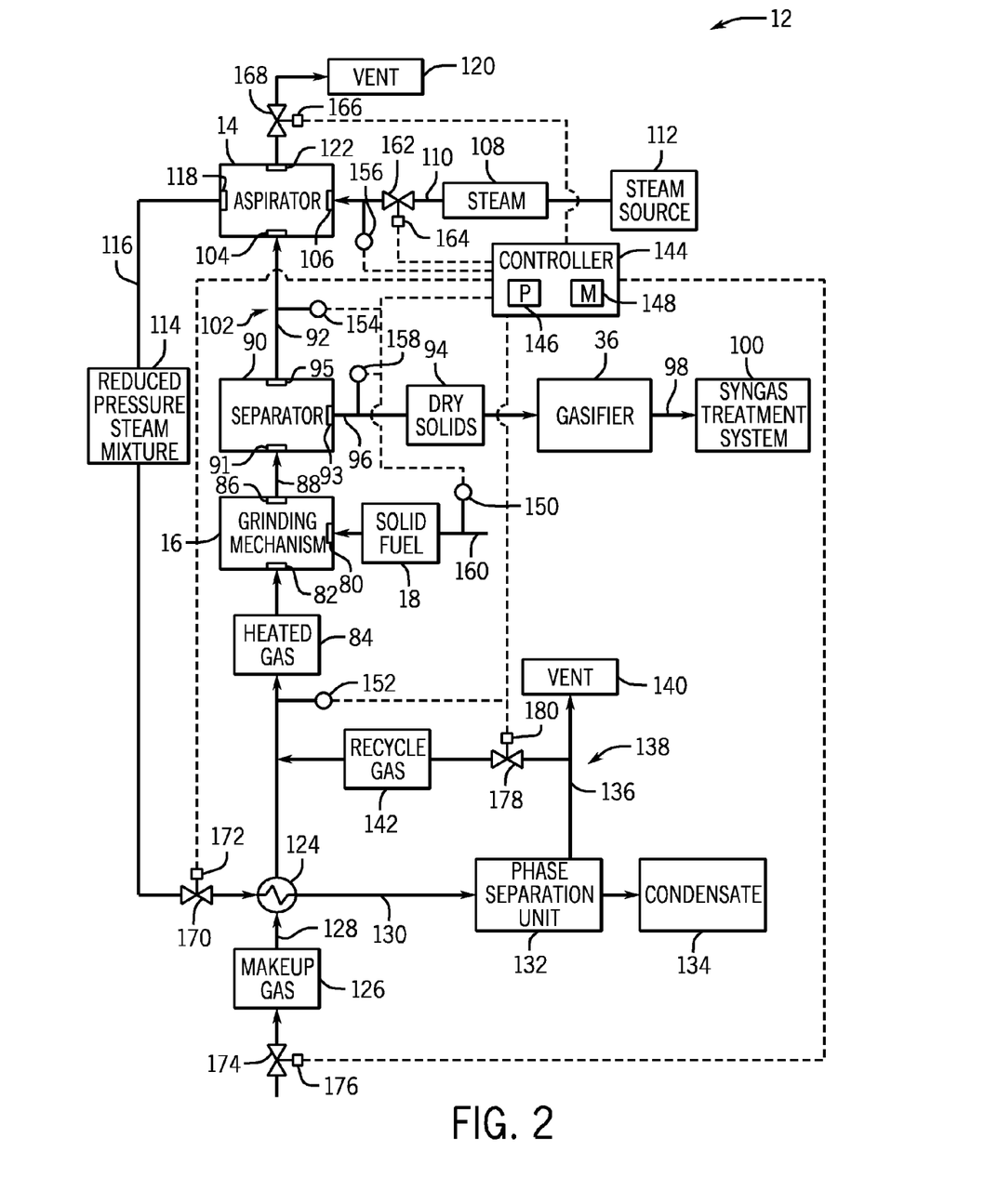
FIG. 2 is a schematic illustration of an embodiment of the feedstock preparation system of FIG. 1 having the aspirator operatively coupled to a gaseous outlet of the grinding mechanism.

As illustrated in FIG. 2, the feedstock preparation system 12 includes the grinding mechanism 16, which is configured to receive the solid fuel 18 at a solid fuel inlet 80. The grinding mechanism also includes a conveyance gas inlet 82, which is configured to receive an influx of a heated gas 84. The heated gas 84, as set forth above, may include the $N_2$ 28, the $CO_2$ 32, or a combination thereof, or another relatively inert conveyance gas. The grinding mechanism 16 is configured to grind the solid fuel 18 to reduce the average size of the fuel to a size that may be at least partially motivated by the heated gas 84. In one embodiment, the ground fuel 18 may be fluidized by the heated gas 84. The heated gas 84 may mix with the ground fuel within the grinding mechanism, which facilitates the stripping of moisture from the fuel by the heated gas 84. Furthermore, because the heated gas 84 may be at a temperature greater than a temperature of the solid fuel 18, at least a portion of the moisture contained within the solid fuel 18 may be vaporized. The grinding mechanism 16 also includes an outlet 86, which is configured to output a multi-phase flow, which is described in detail below.

In the grinding mechanism 16, the heated gas 84 entrains at least a portion of the moisture associated with the solid fuel 18 to produce a first mixture 88, which includes moisture entrained within the heated gas 84 and the ground solid fuel. The first mixture 88 may, in certain embodiments, be provided to a separator 90 configured to separate a moist vapor phase 92 from the dry solids 94 of the first mixture 88. The separator 90 may therefore be any vessel or combination of vessels configured to separate a moist vapor phase from a dry phase. By way of non-limiting example, the separator 90 may be a cyclone and baghouse combination. The first mixture 88 may be provided to the separator 90 through an inlet 91 of the separator 90.

As illustrated, the dry solids 94, which may be all or a portion of the feed of dry solid fuel 22, is output through a first outlet 93 of the separator 90 to the gasifier 36 along a fuel path 96. The gasifier 36, as discussed above, produces syngas 98, which is provided to a syngas treatment system 100, such as a scrubbing system, acid gas removal system, carbon capture system, or any combination thereof. The moist gaseous phase 92, which contains the conveyance gas and moisture, is output from a second outlet 95 of the separator 90 to a first vapor path 102, and to a vapor inlet 104 of the aspirator 14.

The aspirator 14 also includes a steam inlet 106 in addition to the vapor inlet 104. The steam inlet 106 is configured to receive an influx of steam 108 along a steam path 110 from a steam source 112. The steam 108 may be the steam 20 provided from the LTGC 52 as in FIG. 1, or the steam source 112 may be a heat recovery steam generator (HRSG) (e.g., one or more HRSGs associated with combustion turbines), a sulfur recovery unit (SRU) of the sulfur recovery and tail gas treatment system 62, or any combination thereof. Indeed, any suitable source and any suitable pressure are presently contemplated for the steam source 112 and the steam 108, respectively. Thus, the steam source 112 may be a high pressure steam (e.g., between approximately 20 and 40 bar), a medium pressure steam (e.g., between approximately 10 and 20 bar), or a low pressure steam (e.g., between approximately 4 and 10 bar). In one embodiment, for example, the steam 108 may be a low pressure (LP) steam having a pressure between approximately 4 and 9 bar, and a temperature between approximately 145 and 180° C., such as between approximately 150 and 170° C., or 155 and 165° C.

As illustrated, the vapor path 102 and the steam path 110 are oriented in a crosswise relationship with one another. In accordance with present embodiments, the steam 108 flows at a rate sufficient so as to generate a pressure gradient between the aspirator 14 and the grinding mechanism 16 by the Venturi effect. Therefore, the aspirator 14 may be any vessel capable of creating the pressure gradient using the Venturi effect. The pressure gradient between the aspirator 14 and the grinding mechanism 16, in accordance with present embodiments, enables enhanced moisture removal from the solid fuel 18 that is ground within the grinding mechanism 16. By way of non-limiting example, the pressure gradient may facilitate the vaporization of moisture contained within the solid fuel 18. Further, the pressure gradient increases the mass flow rate of the conveyance gas and any entrained and/or vaporized moisture from the grinding mechanism 16 to the aspirator 14. In some embodiments, the pressure gradient may also facilitate separation of the moist vapor phase 92 from the dry solids 94 within the separator 90.

As a result of the mixing of the flows of steam 108 and the moist vapor phase 92, a reduced pressure steam mixture 114 is output by the aspirator 14 to an outlet steam path 116 via a first outlet 118 of the aspirator 14. That is, the reduced pressure steam mixture 114 has a lower pressure than the steam 108. In one non-limiting example, the steam 108 may be an LP steam and the reduced pressure steam mixture 114 may be an ultra low pressure (LLP) steam having a pressure under approximately 4 bar. In certain embodiments, the aspirator 14 may control the amount of the reduced pressure steam mixture 114 that is output via the first outlet 118, or may control an amount of vent gas 120 output via a second outlet 122 to control the pressure gradient between the aspirator 14 and the grinding mechanism 16. Such control is discussed in further detail below.

The reduced pressure steam mixture 114, which includes steam, conveyance gas, and liquid water, flows to a heat exchanger 124 disposed along the outlet steam path 116 to provide heat to a makeup gas 126. As a result of the heat exchange, the makeup gas 126, which flows along a gas path 128, increases in temperature to generate the heated gas 84. Thus, the makeup gas 126 includes any gas that is substantially unreactive with the solid fuel 18 and is capable of conveying the dry solids 94 along the solids path 96. Indeed, such a configuration may be desirable to recover at least a portion of the energy used to vaporize the moisture contained in the solid fuel 18 within the grinding mechanism 16.

A temperature of the reduced pressure steam mixture 114 may also be reduced as a result of the heat exchange at the heat exchanger 124. Accordingly, steam and other vapors that may be condensable at the temperature and pressure at the heat exchanger 124 may condense, generating a cooled stream 130. The cooled stream 130 may, in some embodiments, include liquid water and the conveyance gas. As illustrated, the cooled stream 130 is provided to a phase separation unit 132, which may be a knockout (KO) drum or a tank in which the liquids may fall out as condensate 134. Remaining conveyance gas vapor 136 may be discharged into a recycle gas path 138. A first portion of the vapor 136 may be ejected as vent gases 140, while a second portion may be used as a recycle gas 142, which flows to the gas path 128 to join the heated gas 84.

The control and monitoring functions of the feedstock preparation system 12 may be performed by one or more controllers, such as controller 144. As discussed herein, the controller 144 may be a single processor-based machine (e.g., a computer) that is communicatively coupled to various sensors, control valves, and similar features, or may be two or more processor-based machines. Therefore, the controller 144 may be, in some embodiments, an application-specific or general purpose computer having a processor 146 configured to execute one or more sets of instructions stored in memory 148. The memory 148, which may be any suitable tangible, non-transitory, machine-readable medium, may store the instructions as code, which is accessible and executable by the processor 146 for performing routines for temperature maintenance and/or adjustment, flow maintenance and/or adjustment, troubleshooting, or any combination thereof.

In the illustrated embodiment, the controller 144 is communicatively connected to a first sensor 150, a second sensor 152, a third sensor 154, a fourth sensor 156, and a fifth sensor 158. Generally, the first and second sensors 150, 152 may sense parameters relating to the materials entering into the grinding mechanism 16. Similarly, the third and fourth sensors 154, 156 may sense parameters relating to the materials entering into the aspirator 14. Finally, the fifth sensor 158 may sense parameters relating to one or more of the materials output by the feedstock preparation system 12.

In the illustrated embodiment, the first sensor 150 is disposed along a path 160 leading to the grinding mechanism 16. The first sensor 150 may sense various parameters relating to the solid fuel 18, and enable the controller 144 to monitor these parameters. By way of non-limiting example, the first sensor 150 may sense an amount of solid fuel 18 entering the grinding mechanism 16, a flow rate of the fuel 18, a temperature of the fuel 18, a moisture level of the fuel 18, or any combination thereof. The second sensor 152 is disposed along the gas path 128, and may sense, and enable the controller 144 to monitor, various parameters relating to the heated gas 84. By way of non-limiting example, the second sensor 152 may sense a mass flow rate of the heated gas 84 entering the grinding mechanism 16, a temperature of the heated gas 84, a moisture level of the heated gas, or any combination thereof.

As noted above, the third and fourth sensors 154, 156 may sense parameters relating to the materials provided to the aspirator 14. In the illustrated embodiment, the third sensor 154 is disposed along the first vapor path 102, and may sense, and enable the controller to monitor, various parameters relating to the moist gaseous phase 92. By way of non-limiting example, the third sensor 154 may sense a composition of the gaseous phase 92, a moisture level of the moist gaseous phase 92, a temperature of the moist gaseous phase 92, a mass flow rate of the moist gaseous phase 92, a pressure of the moist gaseous phase 92, or any combination thereof. The fourth sensor 156 is disposed along the steam path 110, and may sense, and enable the controller to monitor, various parameters relating to the pressurized steam 108 provided to the aspirator 14. By way of non-limiting example, the fourth sensor 156 may sense a temperature of the pressurized steam 108, a mass flow rate of the pressurized steam 108, a pressure of the pressurized steam 108, or any combination thereof.

The fifth sensor 158 is disposed along the path 96, and may sense, and enable the controller 144 to monitor, parameters relating to the dry solids 94. By way of non-limiting example, the fifth sensor 158 may sense a moisture level of the dry solids 94, a temperature of the dry solids 94, an amount of the dry solids 94, or any combination thereof.

The illustrated controller 144 is also communicatively coupled to a plurality of valves, which are each disposed along a path within the system 12 and are configured to control a flow of the material along the respective path. The controller 144 may adjust the position of any one or a combination of these valves in response to the monitored parameters noted above. In other words, the controller 144 may adjust various flow rates of the materials used within the feedstock preparation system 12 in response to one or more monitored parameters. The controller 144 may operate based on models or prescribed responses as a result of the recognition of specific parametrical values. Non-limiting examples of the valves used to control flows in response to monitored parameters are discussed herein. However, other control valves or other monitoring and control features may be used in addition to or in lieu of the components and approaches described herein for facilitating the removal of moisture from the solid fuel 18 using the steam-based aspirator 14 using the controller 144.

To enable the aspirator 14 to generate a pressure gradient between the aspirator 14 and the grinding mechanism 16, the controller 144 enables the pressurized steam 108 to flow along the steam path 110 by adjusting a first valve 162 to a suitable position using a first valve actuator 164. In response to various monitored parameters, such as in response to a monitored mass flow rate of the steam 108, the controller 144 may send one or more control signals to the first valve actuator 164 to adjust the position of the first valve 162 to a desired position to achieve a desired flow rate of the steam 108. The controller 144 may perform similar adjustments in response to other parameters including, but not limited to, the mass flow rate or pressure of the moist vapor phase 92. For example, it may be desirable to increase a mass flow rate of the moist vapor phase 92 to the aspirator 14, in which case the flow rate of the steam 108 may be increased to increase the pressure gradient between the aspirator 14 and the grinding mechanism 16 (e.g., to reduce the pressure of the aspirator 14 relative to the grinding mechanism 16). The pressure of the aspirator 14 may also be adjusted by allowing the release of the vent gases 120. In the illustrated embodiment, the controller 144 may send control signals to a second actuator 166 of a second valve 168, which may affect the pressure gradient between the aspirator 14 and the grinding mechanism 16. By way of non-limiting example, the vent gases 120 may be controllably released for finer control of the pressure within the aspirator 14 compared to the adjustment of the flow rate of the steam 108.

Additionally or alternatively, the flow rate of the steam 108 may be adjusted to vary a temperature of the heated gas 84, as the makeup gas 126 is heated by the flow of the reduced pressure steam mixture 114, which is directly related to the flow of the pressurized steam 108. Similarly, a flow rate of the reduced pressure steam mixture 114 may also be directly adjusted. For example, in the illustrated embodiment, the controller 144 is communicatively coupled to a third valve 170 disposed along the outlet path 116. The controller 144 may adjust the flow rate of the reduced pressure steam mixture 114 to increase, reduce, or maintain the heating of the makeup gas 126. The controller 144 may send one or more control signals to a third actuator 172 of the third valve 170 to adjust the position of the valve 170 to a suitable position. By way of non-limiting example, the controller 144 may monitor the temperature of the heated gas 84 to maintain its temperature below an ignition temperature of the solid fuel 18 while remaining at a temperature suitable for drying the solid fuel 18. By way of non-limiting example, the controller 144 may maintain the temperature of the heated gas 84 between approximately 90 and 120° C., such as between approximately 95 and 115° C., or between approximately 100 and 110° C. Additionally, flame-retarding conveyance gases may be utilized as all or a part of the heated gas 84 to reduce the possibility of such ignition and, in some embodiments, to enable heating of the solid fuel 18 above a coal ignition temperature.

In certain embodiments, the controller 144 may adjust a flow rate of the heated gas 84. In the illustrated embodiment, the flow rate of the heated gas 84 may be controlled by controlling a flow rate of the makeup gas 126 and/or a flow rate of the recycle gas 142. To perform such adjustments, the controller 144 is communicatively coupled to a fourth valve 174 and its associated fourth actuator 176, which are disposed along the gas path 128. Thus, to adjust a flow rate of the makeup gas 126, the controller 144 may send one or more control signals to the fourth actuator 176 to adjust the position of the fourth valve 174. The controller 144 is also illustrated as communicatively coupled to a fifth valve 178 and its associated fifth actuator 180, which are disposed along the recycle gas path 138. Thus, the controller 144 may send one or more control signals to the fifth actuator 180 to adjust the position of the fifth valve 178 to a suitable position.

As noted above, the controller 144 may adjust either or both of the fourth and fifth valves 174, 178 to adjust the flow of the heated gas 84. For example, the controller 144 may adjust the positions of the fourth and/or fifth valves 174, 178 in response to a measured flow rate of the dry solids 94 to the gasifier 36. For example, the flow rate of the dry solids 94 to the gasifier 36 may be undesirably low, in which case the controller 144 may send control signals to the fourth and/or fifth actuators 176, 180 to adjust the flow rate of the heated gas 84. In doing so, a ratio of the heated gas 84 to the solid fuel 18 may be increased, which may increase the flow rate of the dry solids 94 exiting the grinding mechanism 16. Conversely, reducing the flow rates of the makeup gas 126 and/or the recycle gas 142 may reduce the flow rate of the dry solids 94.

In certain embodiments, it may be desirable to heat the makeup gas 126 (i.e., the conveyance gas) beyond a temperature attainable using only the reduced pressure steam mixture 114 and the heat exchanger 124. For example, as the reduced pressure steam mixture 114 reaches the heat exchanger 124, it may not have a temperature that is suitable for heating the makeup gas 126 to a desired level. Therefore, in certain embodiments, it may be desirable to heat the makeup gas 126 using additional heat, which may result in enhanced moisture removal from the solid fuel 18. One embodiment of the feedstock preparation system 12 where the makeup gas 126 is heated by an additional source is illustrated diagrammatically in FIG. 3.

Figure 3:
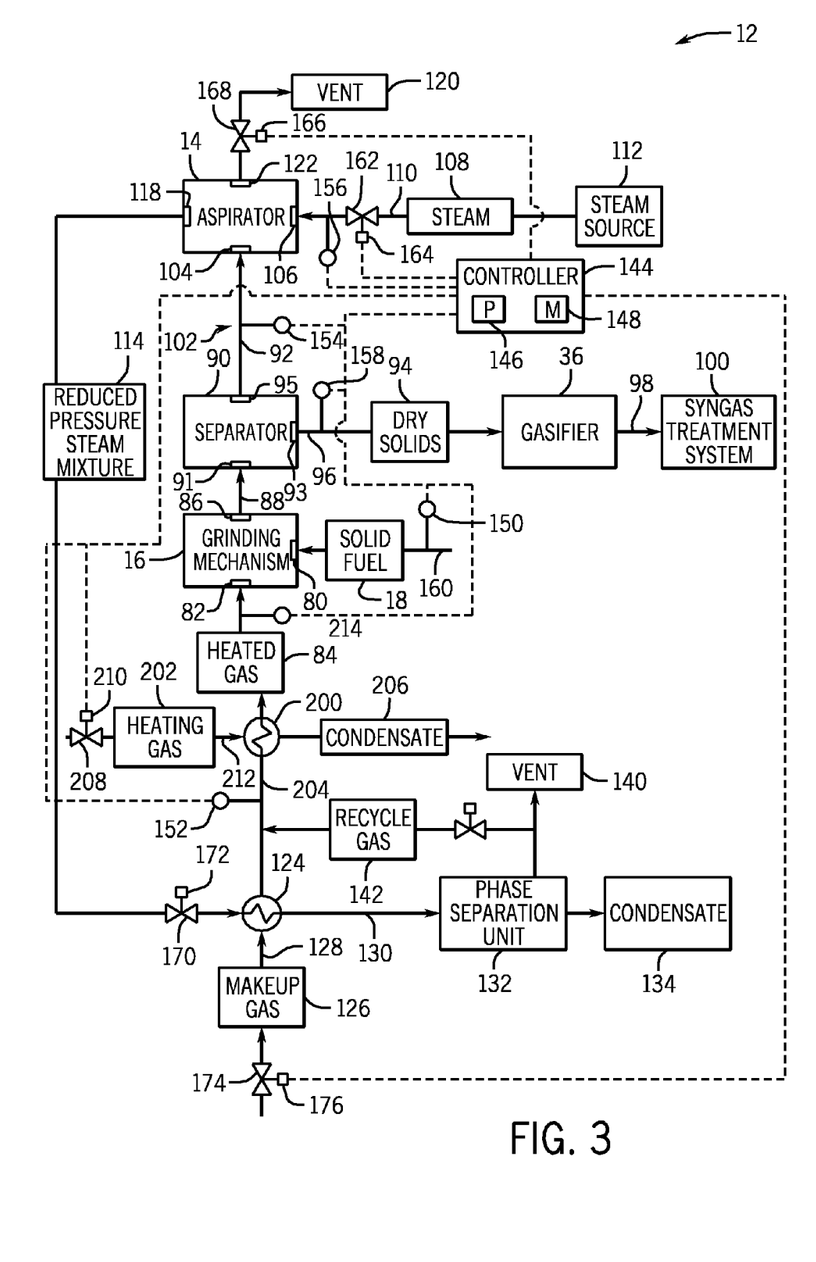
FIG. 3 is a schematic illustration of an embodiment of the feedstock preparation system of FIG. 1 having the aspirator operatively coupled the gaseous outlet of the grinding mechanism, with additional heat being provided to a heated conveyance gas configured to remove moisture from the solid fuel within the grinding mechanism.

In the illustrated embodiment of FIG. 3, the feedstock preparation system 12 includes an additional heat exchanger 200 disposed along the gas path 128 between the heat exchanger 124 and the grinding mechanism 16. In certain embodiments, the additional heat exchanger 200 may be disposed along the gas path 128 just upstream of the inlet 82. The heat exchanger 200 is configured to transfer heat from a heating gas 202 to a stream of heated conveyance gas 204 flowing along the gas path 128.

Any gas with a higher temperature than the stream of heated conveyance gas 204 is presently contemplated for use as the heating gas 202, such as LP, MP, or HP steam. In certain embodiments, the heating gas 202 may include hot combustion gases produced from the combustion of a fuel, such as syngas. By way of non-limiting example, the heating gas 202 may include hot combustion gases provided from one or more gas turbine engines of a power generation area of the system 10 of FIG. 1. In embodiments where the heating gas 202 includes steam, the transfer of heat away from the steam may cause the steam to condense to produce condensate 206.

The flow of the heating gas 202 may be at least partially controlled using a valve 208 and an associated actuator 210 disposed along a heating gas path 212 leading to the heat exchanger 200. Indeed, the illustrated feedstock preparation system 12 includes a sensor 214 disposed between the additional heat exchanger 200 and the conveyance gas inlet 82 of the grinding mechanism 16, which senses various parameters of the heated gas 84. Thus, the controller 144 may monitor the temperature and/or another parameter (e.g., mass flow rate) of the heated gas 84, as well as the temperature and/or another parameter of the stream of heated conveyance gas 204. Based on such measurements, the controller 144 may adjust a flow of the heating gas 202 to adjust the temperature of the heated gas 84. As illustrated, the controller 144 may send one or more control signals to the actuator 210 to adjust a position of the valve 208 to an appropriate position for the desired flow rate of the heating gas 202. Again, the temperature of the heated gas 84 may be selected to enable the heated gas 84 to remove moisture from the solid fuel 18 as the aspirator 14 generates the pressure gradient between the aspirator 14 and the grinding mechanism 16.

In certain embodiments, the feedstock preparation system 12 may not use heat exchangers disposed along the gas path 124, or may use other sources of heat in addition to the heat exchangers and hot gases crossing the gas path 124. Rather, in the diagrammatical illustration of an embodiment of the feedstock preparation system 12 in FIG. 4, the grinding mechanism 16 may include a heat exchanger 220 for heating a mixture of conveyance gas 122 and the solid fuel 18. Specifically, the heat exchanger 220 may be disposed within the grinding mechanism 16 to provide heat transfer from the reduced pressure steam mixture 114 to the solid fuel 18 as it is pulverized. The conveyance gas 122, which flows along the gas path 128 to the grinding mill 16, may also be heated within the grinding mill 16.

Figure 4:
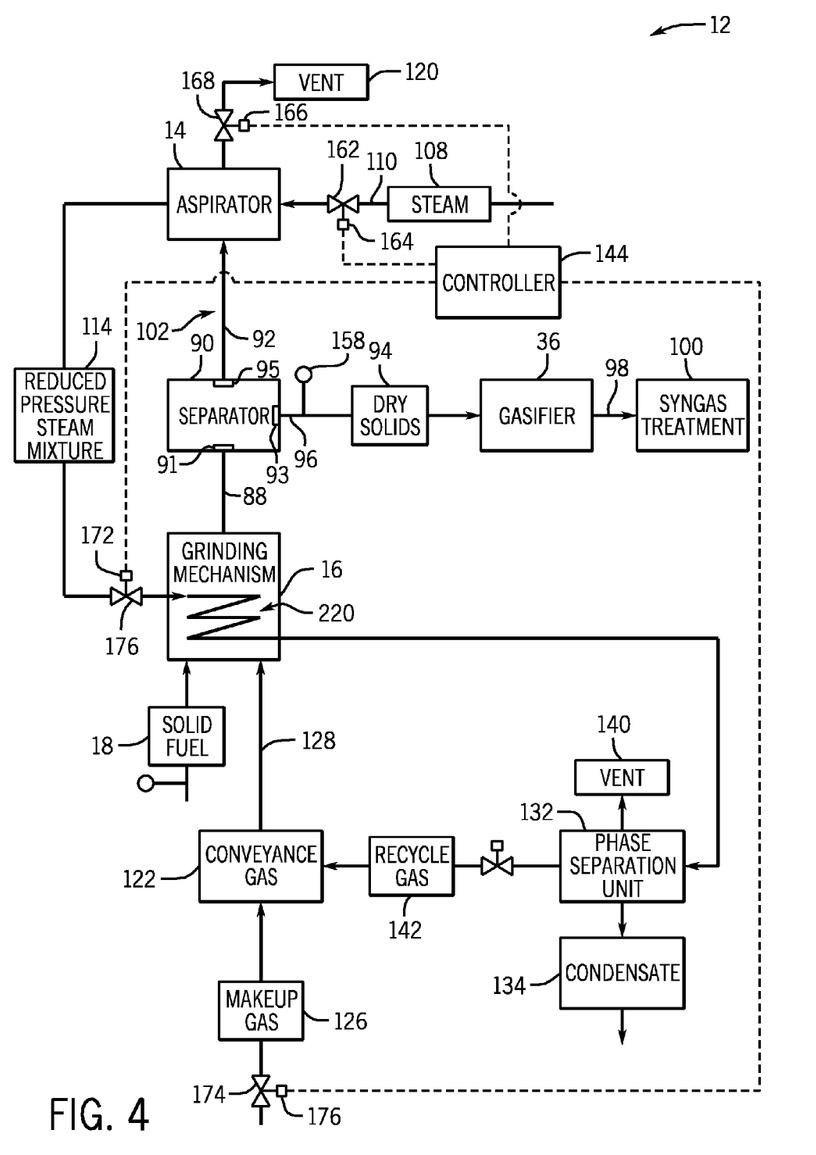
FIG. 4 is a schematic illustration of an embodiment of the feedstock preparation system of FIG. 1 having the aspirator operatively coupled the gaseous outlet of the grinding mechanism, with heat being provided to a heat exchanger disposed within the grinding mechanism to facilitate the removal of moisture from the solid fuel.

Recovery of the energy used to remove moisture from the solid fuel 18 may be enhanced in the embodiment of FIG. 4 compared to the embodiments of FIG. 2 or 3. For example, as illustrated, the reduced pressure steam mixture 114 may travel a shorter distance from the outlet 118 of the aspirator 14 to the point in which heat is recovered (i.e., the heat exchanger 220) in FIG. 4, than the distance traveled by the reduced pressure steam mixture 114 to the heat exchanger 124 in either of FIG. 2 or 3. In other words, there may be less heat lost by the reduced pressure steam mixture 114 as it flows along various conduits and pathways due to a shorter traveled distance from the outlet 118 to the point in which heat is transferred from the reduced pressure steam mixture 114 to the conveyance gas 122 and/or the solid fuel 18. Furthermore, the heat lost due to the flow of the heated gas 84 along various conduits and pathways may also be reduced or eliminated.

Figure 5:
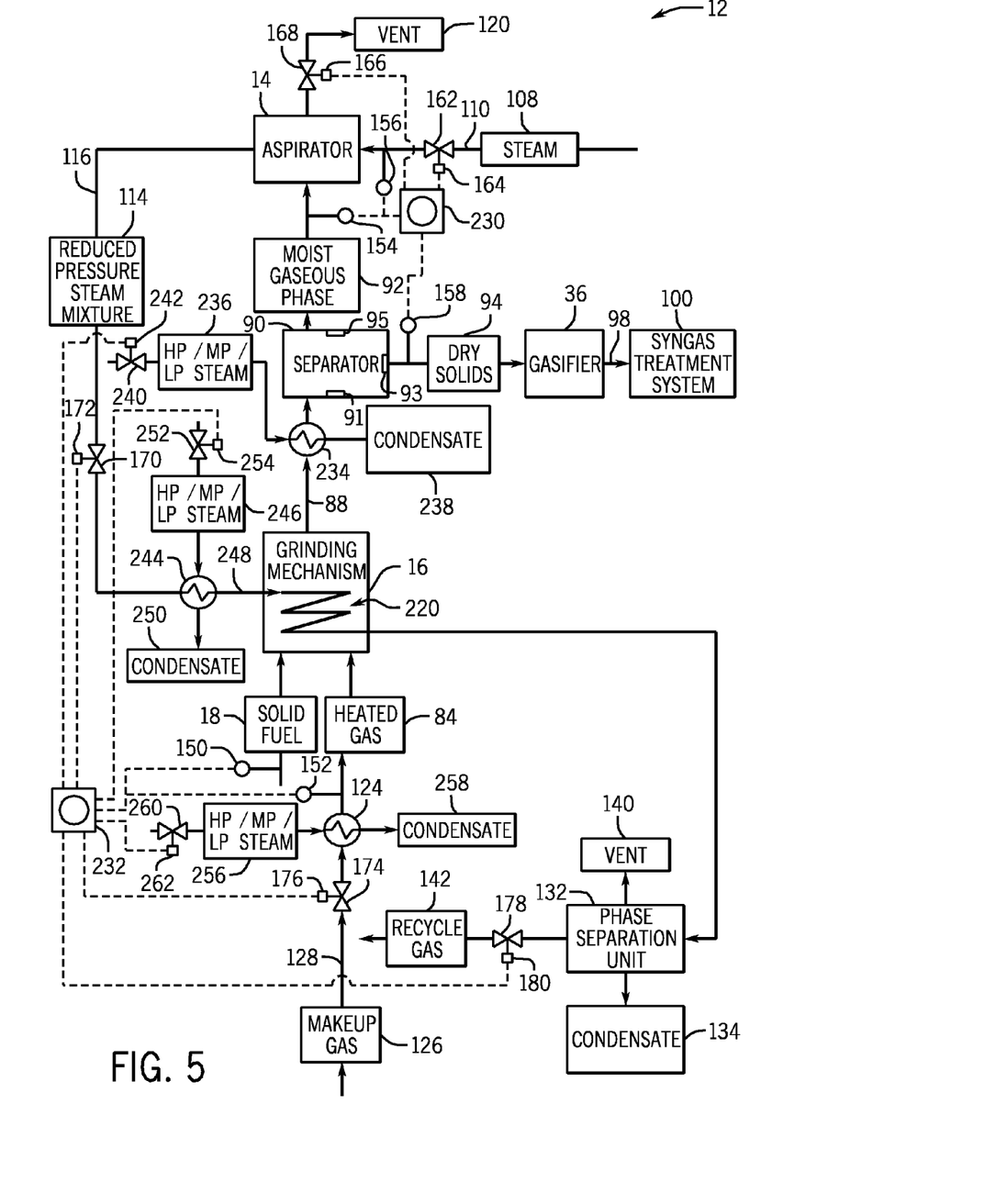
FIG. 5 is a schematic illustration of an embodiment of the feedstock preparation system of FIG. 1 having the aspirator operatively coupled the gaseous outlet of the grinding mechanism, with additional heat being provided to a heated conveyance gas configured to remove moisture from the solid fuel within the grinding mechanism, to a heat exchanger disposed within the grinding mechanism, and to the dried coal and/or moist gaseous phase downstream from the grinding mechanism.

While the embodiments discussed above are described as being used separately, it should be noted that the use of these embodiments in any combination is also presently contemplated. In other words, any heat integration which recovers heat/energy from the steam mixture 114 output from the aspirator 14 is presently contemplated. Furthermore, it should be noted that steam or any heat source from any section or part of the system 10 of FIG. 1 may be integrated with the feedstock preparation system 12. In other words, the heat integration features of the feedstock preparation system 12 are not limited to the specific paths/conduits shown. Rather, any heat integration to facilitate moisture removal from the solid fuel 18 using the aspirator 14 is presently contemplated. FIG. 5 illustrates an embodiment of the feedstock preparation system 12 having one such combination of heat integration.

In addition to the heat integration features illustrated, it should be noted that, in embodiments where the heat sources used in the feedstock preparation system 12 are not generated within the feedstock preparation system 12, other controllers, which may or may not be local to the feedstock preparation system 12, may be utilized. By way of non-limiting example, as illustrated, the feedstock preparation system 12, and, more generally, the gasification system 10, may utilize a distributed control system (DCS), in which one or more controllers locally control one or more valves and monitor the output of one or more sensors, with a main controller performing higher level monitoring and control. In the embodiment illustrated in FIG. 5, the DCS includes a first local controller 230 and a second local controller 232. The first local controller 230 may control an output of the feedstock preparation system 12, such as a flow of the dry solids 94 to the gasifier 36 and/or a flow of the steam 108 to the aspirator 14. The second local controller 232 may control the heating and flow rates of various inputs to the grinding mechanism 16, which are discussed in detail below. Furthermore, while first and second local controllers 230, 232 are illustrated to facilitate discussion of the present approaches, any number of local controllers or master controllers (e.g., controllers operating one or more local controllers) is presently contemplated. Therefore, the feedstock preparation system 12 may include a single controller (e.g., controller 144), or two or more controllers (e.g., local controllers 230, 232).

In the illustrated embodiment, the first local controller 230 monitors parameters related to the moist gaseous phase 92, the steam 108, and the dry solids 94, which are sensed by the third, fourth, and fifth sensors 154, 156, 158, respectively. In certain embodiments, however, the first local controller 230 may monitor more or less parameters relating to any one or a combination of the flows utilized and/or produced within the feedstock preparation system 12. As a result of monitoring any one or a combination of these parameters, the first local controller 230 is configured to adjust the respective positions of the first and/or second valves 162, 168. For example, the first local controller 230 may adjust the first and/or second valves 162, 168 to adjust the flow of steam 108 through the aspirator 14 and/or the flow of vent gases 120 out of the aspirator 14 to adjust a pressure gradient (i.e., a vacuum) between the aspirator 14 and the grinding mechanism 16, which may affect the mass flow rate of the moist gaseous phase 92 to the aspirator 14. In other words, the first local controller 230 may adjust, at least partially, the extent to which moisture is removed from the solid fuel 18 by vacuum forces.

As illustrated, the second local controller 232 may monitor various parameters relating to the solid fuel 18 and the heated gas 84 using the first and second sensors 150, 152. As a result of this or other monitoring, the second local controller 232 may make various adjustments to flows of steam to reduce, maintain, or increase a temperature of the heated gas 84 and/or the moist gaseous phase 92. Indeed, the illustrated feedstock preparation system 12 includes additional sources of heat for heating any one or a combination of gaseous flows.

Specifically, the feedstock preparation system 12 includes a first additional heat exchanger 234 disposed between the grinding mechanism 16 and the separator 90. The first additional heat exchanger 234 is configured to enable heat transfer from a second steam 236, which may be a LP, MP, or HP steam, to the first mixture 88. As a result of heat transfer to the first mixture 88, a condensate 238 may be produced. In the illustrated embodiment, the second local controller 232 may adjust the position of a sixth valve 240 via a sixth actuator 242, which controls the flow of the second steam 236 through the first additional heat exchanger 234 to adjust a temperature of the first mixture 88. In certain embodiments, such temperature adjustment may be desirable to provide additional heat to the solids of the first mixture 88, which may further enhance moisture removal from the solid fuel 18.

As noted above, heat may be lost from the reduced pressure steam mixture 114 as the mixture 114 flows along the outlet path 116. Further, it may be desirable to provide additional heat to the mixture 114 to increase heat transfer to the materials within the grinding mechanism 16, which may facilitate moisture removal from the solid fuel 18. Accordingly, a second additional heat exchanger 244 is positioned along the outlet path 116 to transfer heat from a third steam 246, which may be an LP, MP, or HP steam, or any combination thereof, to the mixture 114. As a result of this heat transfer, a second heated mixture 248 is produced and flows through the heat exchanger 220 within the grinding mechanism 16, and flows to the phase separation unit 132. Additionally, as a result of the heat transfer at the second additional heat exchanger 244, condensate 250 may be produced from the third steam 246. The flow of the third steam 246 may be controlled by the second local controller 232 using a seventh valve 252. Specifically, the second local controller 232 may send one or more control signals to an actuator 254 to adjust the position of the seventh valve 252.

In lieu of the reduced pressure steam mixture 116, a fourth steam 256, which may be an LP, MP, HP steam, or any combination thereof, may flow through the heat exchanger 124 to heat the makeup gas 126 to produce the heated gas 84. As a result of this heat transfer to the makeup or conveyance gas 126, a condensate 258 may be produced. The flow of the fourth steam 256 may be controlled by the second local controller 232 using an eighth valve 260. Specifically, the second local controller 232 may send one or more control signals to an actuator 262 to adjust the position of the eighth valve 260 to reduce, maintain, or increase the temperature of the heated gas 84. Again, controlling the temperature of the heated gas 84 may enable enhanced removal of moisture from the solid fuel 18 when used in combination with the vacuum forces created by the aspirator 14. It should be noted that in certain embodiments, the first, second, third, or fourth steams 108, 236, 246, 256, or any combination thereof, may be from the same source.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a feedstock preparation system configured to provide a feed comprising a ground solid fuel to a gasification system, wherein the feedstock preparation system comprises:
a grinding mechanism configured to receive a solid feed comprising a solid fuel and to grind the solid feed in the presence of a conveyance gas to produce a mixture of the ground solid fuel and a moist gaseous phase, wherein the moist gaseous phase comprises the conveyance gas and moisture from the solid fuel;
an aspirator, comprising:
a first inlet configured to receive a flow of steam;
a second inlet configured to receive a flow of the moist gaseous phase; and
a fluid outlet configured to output a reduced pressure flow comprising the flow of steam and the flow of the moist gaseous phase;
wherein the aspirator is configured to enhance moisture removal from the ground solid fuel; and
a gasifier configured to receive the feed from the feedstock preparation system and subject the feed to gasification conditions to produce an untreated syngas.

2. The system of claim 1, wherein the feedstock preparation system comprises a separator configured to receive the mixture of the ground solid fuel and the moist gaseous phase from the grinding mechanism and separate the ground solid fuel from at least a portion of the moist gaseous phase to produce the feed.

3. The system of claim 2, wherein the second inlet of the aspirator is coupled to an outlet of the separator to receive the portion of the moist gaseous phase separated from the ground solid fuel.

4. The system of claim 2, wherein the feedstock preparation system comprises a heat exchanger coupled to an outlet of the grinding mechanism and to an inlet of the separator, and wherein the heat exchanger is configured to increase a temperature of the mixture of the ground solid fuel and the moist gaseous phase.

5. The system of claim 1, wherein the feedstock preparation system is configured to remove at least 10% of the moisture in the solid feed.

6. The system of claim 1, wherein the second inlet is configured to receive the flow of the moist gaseous phase in a crosswise direction with respect to the flow of steam received by the first inlet.

7. The system of claim 1, wherein the aspirator is configured to receive the flow of steam as a steam flow having a pressure between approximately 4 bar and 9 bar.

8. The system of claim 1, wherein the feedstock preparation system comprises:

a flow path configured to deliver the steam to the aspirator from a steam source; and a flow control valve disposed on the conduit and configured to control a flow rate of the flow of steam to the aspirator.

9. The system of claim 8, wherein the steam source comprises a heat recovery steam generation (HRSG) unit of the gasification system, a sulfur recovery unit (SRU) of the gasification system, a low temperature gas cooling (LTGC) section of the gasification system, or any combination thereof.

10. The system of claim 8, wherein the feedstock preparation system comprises a controller configured to couple to the flow control valve, wherein the controller is configured to adjust a position of the flow control valve to adjust the flow rate of the flow of steam in response to feedback indicative of a moisture content of the dry feed, a pressure of the flow of steam, a feed rate of the solid feed to the grinding mechanism, a moisture content of the solid feed, or any combination thereof.

11. The system of claim 1, wherein the feedstock preparation system comprises a heat exchanger disposed upstream of the grinding mechanism, the heat exchanger is configured to transfer thermal energy to a flow of makeup gas to produce the conveyance gas before the conveyance gas is provided to the grinding mechanism, and a source of the thermal energy comprises the reduced pressure flow, an additional flow of steam, or a combination thereof.

12. The system of claim 1, wherein the feedstock preparation system comprises a heat exchanger disposed within the grinding mechanism, the heat exchanger is configured to transfer thermal energy to a flow of the conveyance gas to heat the conveyance gas within the grinding mechanism, and a source of the thermal energy comprises the reduced pressure flow, an additional flow of steam, or a combination thereof.

13. A system, comprising:
a feedstock preparation system configured to provide a feed comprising a ground solid fuel to a gasification system, wherein the feedstock preparation system comprises:
a grinding mechanism configured to receive a solid feed comprising a solid fuel and grind the solid feed in the presence of a conveyance gas to produce a mixture of the ground solid fuel and a moist gaseous phase, wherein the moist gaseous phase comprises the conveyance gas and moisture from the solid fuel;
an aspirator configured to receive and mix a flow of steam and a flow of the moist gaseous phase, wherein the aspirator is configured to create a pressure gradient between the grinding mechanism and the aspirator to enhance moisture removal from the ground solid fuel; and
a gasifier configured to receive the feed from the feedstock preparation system and subject the dry feed to gasification conditions to produce an untreated syngas.

14. The system of claim 13, wherein the feedstock preparation system comprises a separator configured to receive the mixture of the ground solid fuel and the moist gaseous phase from the grinding mechanism and separate the ground solid fuel from at least a portion of the moist gaseous phase to produce the feed.

15. The system of claim 14, wherein the aspirator comprises an inlet coupled with an outlet of the separator, wherein the outlet of the separator is configured to output the flow of the moist gaseous phase to the aspirator.

16. The system of claim 15, wherein the aspirator is configured to mix the flow of steam and the flow of the moist gaseous phase via crosswise flows to cause the moist gaseous phase to flow toward the aspirator.

* * * * *